US009727295B2

(12) United States Patent
Holung et al.

(10) Patent No.: US 9,727,295 B2
(45) Date of Patent: Aug. 8, 2017

(54) EXTENDABLE DISPLAY MECHANISM

(71) Applicant: Lenovo (Singapore) Pte. Ltd., Singapore (SG)

(72) Inventors: Joseph Anthony Holung, Wake Forest, NC (US); Tin-Lup Wong, Chapel Hill, NC (US); Bouziane Yebka, Apex, NC (US); Philip John Jakes, Durham, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 5 days.

(21) Appl. No.: 14/109,520

(22) Filed: Dec. 17, 2013

(65) Prior Publication Data
US 2015/0169274 A1    Jun. 18, 2015

(51) Int. Cl.
*G06F 1/16* (2006.01)
*G06F 3/14* (2006.01)

(52) U.S. Cl.
CPC .......... *G06F 3/1423* (2013.01); *G06F 1/1624* (2013.01); *G06F 1/1626* (2013.01); *G06F 1/1641* (2013.01); *G06F 3/1446* (2013.01); *G09G 2300/023* (2013.01); *G09G 2300/026* (2013.01)

(58) Field of Classification Search
CPC . G09G 2300/026; G06F 3/1446; G06F 3/147; G06F 3/1431; G02F 1/13336
USPC .................................................. 345/1.1–3.4
See application file for complete search history.

(56) References Cited

U.S. PATENT DOCUMENTS

| | | | |
|---|---|---|---|
| 2002/0118144 A1* | 8/2002 | Edmonds | G09G 5/006 345/1.1 |
| 2006/0082518 A1 | 4/2006 | Ram | |
| 2010/0087232 A1 | 4/2010 | Yeh et al. | |
| 2010/0188350 A1 | 7/2010 | Sawada | |
| 2011/0098019 A1* | 4/2011 | Fujii | H04M 1/576 455/411 |
| 2011/0157036 A1 | 6/2011 | Yang | |
| 2012/0026654 A1* | 2/2012 | Ou et al. | 361/679.01 |
| 2012/0162082 A1 | 6/2012 | Mori | |
| 2012/0229399 A1 | 9/2012 | Kobayashi et al. | |

(Continued)

FOREIGN PATENT DOCUMENTS

EP    02120426 A1    11/2009
EP    2592523 A1    5/2013

(Continued)

OTHER PUBLICATIONS

UK IPO Examination Report GB 1421899.9 of Jun. 5, 2015 (9 pages).

(Continued)

*Primary Examiner* — Lisa Landis
(74) *Attorney, Agent, or Firm* — Brian J. Pangrle

(57) ABSTRACT

A system can include a processor; memory operatively coupled to the processor; a first display unit that includes a first planar display operatively coupled to the processor; a second display unit that includes a second planar display; and a mechanism that selectively transitions the first planar display and the second planar display between a stacked orientation and a side-by-side orientation that forms a planar extended display operatively coupled to the processor. Various other apparatuses, systems, methods, etc., are also disclosed.

18 Claims, 9 Drawing Sheets

(56) References Cited

U.S. PATENT DOCUMENTS

| | | | |
|---|---|---|---|
| 2013/0021266 A1 | 1/2013 | Selim | |
| 2013/0021284 A1 | 1/2013 | Koda | |
| 2013/0141857 A1* | 6/2013 | Sano | H04M 1/021 361/679.27 |
| 2014/0378183 A1* | 12/2014 | Xiong | H04M 1/72522 455/556.1 |

FOREIGN PATENT DOCUMENTS

| | | |
|---|---|---|
| JP | 2012-137846 A | 7/2012 |
| JP | 2013-073430 A | 4/2013 |
| WO | 2012134087 A2 | 10/2012 |
| WO | 2013150980 A1 | 10/2013 |

OTHER PUBLICATIONS

Japanese Patent Application No. 2014-244419, Office Action of Jan. 12, 2016 (4 pages).
German Patent Application No. 10 2014 118 099.2, Examination Report of Jan. 22, 2016 (9 pages).
German Patent Application No. 10 2014 118 099.2, Examination Report of Mar. 7, 2017 (9 pages).

\* cited by examiner

EXTENDABLE DISPLAY MECHANISM

TECHNICAL FIELD

Subject matter disclosed herein generally relates to displays.

BACKGROUND

Various devices, systems, etc. include a fixed size display. For example, a phone may include a fixed size display, a tablet may include a fixed size display, a notebook may include a fixed size display, etc. As an example, a user may have various devices where each has a different size display that may be sized depending on one or more factors such as, for example, portability, performing various tasks, etc. For example, a phone display may be smaller than a tablet display, which may be smaller than a notebook display. Depending on tasks to be performed, a user may opt to carry one or more devices with different size displays.

SUMMARY

A system can include a processor; memory operatively coupled to the processor; a first display unit that includes a first planar display operatively coupled to the processor; a second display unit that includes a second planar display; and a mechanism that selectively transitions the first planar display and the second planar display between a stacked orientation and a side-by-side orientation that forms a planar extended display operatively coupled to the processor. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
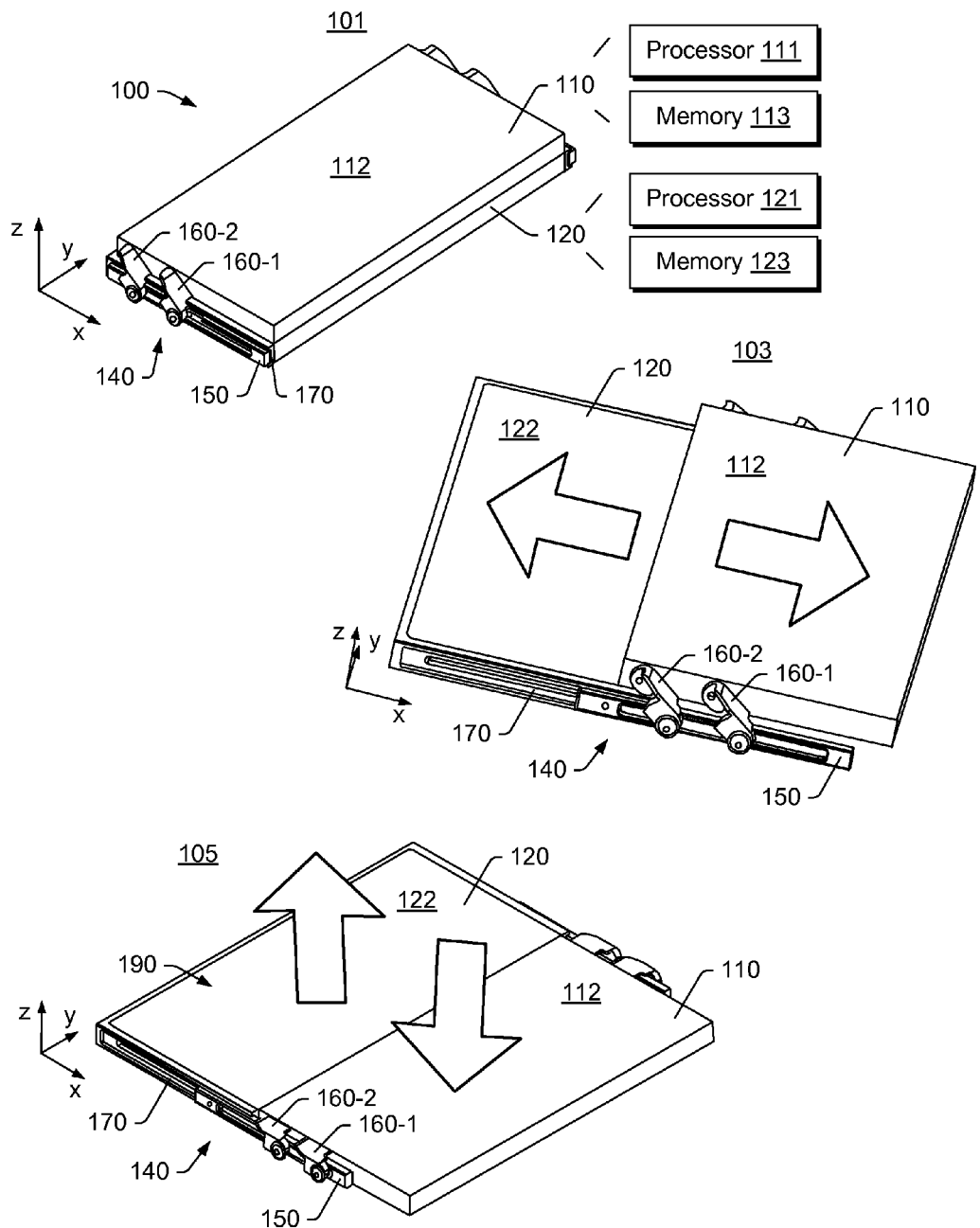
FIG. 1 is a series of diagrams of an example of a system.

FIG. 1 shows an example of a system 100 that includes a first display unit 110 with a planar display 112, a second display unit 120 with a planar display 122 and a mechanism 140 that selectively transitions the first display unit 110 and the second display unit 120 between a stacked orientation 101 and a side-by-side orientation 105 that forms a planar extended display 190 (e.g., from the planar display 112 and the planar display 122). FIG. 1 shows the stacked orientation 101 and the side-by-side orientation 105 along with a transitional orientation 103. The orientations 103 and 105 are shown with large arrows to indicate relative movement of the first display unit 110 and the second display unit 120. For example, one or both of the display units 110 and 120 may be moved to transition from one orientation to another orientation.

As an example, the mechanism 140 may include a rail 150 that may be operatively coupled to the first display unit 110 via one or more pivot arms 160-1 and 160-2. As an example, the mechanism 140 may include a guide 170 where, for example, the rail 150 may translate in the guide 170 (e.g., to be guided by the guide 170). As an example, a mechanism may include one or more pivot arms or linkages that pivotably transition a first planar display with respect to a second planar display to form a planar extended display.

As an example, the first display unit 110 may include a processor 111 and, for example, memory 113 operatively coupled to the processor 111. In such an example, the processor 111 may render information to the planar display 112 of the first display unit 110, for example, in the stacked orientation 101 and, for example, may render information to the extended planar display 190 (e.g., formed by the planar display 112 of the first display unit 110 and the display 122 of the second display unit 120), for example, in the side-by-side orientation 105. As an example, the second display unit 120 may include a processor 121 and, for example, memory 123 operatively coupled to the processor 121. As an example, the second display unit 120 may include circuitry to receive information from the first display unit 110 and for rendering such information to the planar display 122 of the second display unit 120.

As an example, the system 100 may be assembled and disassembled. For example, the mechanism 140 may be optionally configured to connect and disconnect from the first display unit 110. As an example, a user may have the first display unit 110, desire an extended display, acquire the mechanism 140 along with the second display unit 120 and connect the mechanism 140 and the second display unit 120 to the first display unit 110 to form the system 100.

As an example, the system 100 may include one or more interfaces for transfer of information from one of the display units 110 and 120 to the other of the display units 110 and 120. As an example, the system 100 may include one or more interfaces for transfer of information between the display units 110 and 120. As an example, an interface may be a wireless interface. As an example, an interface may be a wired interface. As an example, an interface may be operable and/or implemented in the side-by-side orientation 105. As an example, a transition to the side-by-side orientation 105 may trigger interface circuitry, for example, to cause information to be rendered to the extended planar display 190 (e.g., to both the planar display 112 and the planar display 122, optionally simultaneously).

As an example, the first display unit 110 may include a battery or batteries. As an example, the second display unit 120 may include a battery or batteries. As an example, the first display unit 110 and the second display unit 120 may each include a battery (e.g., or batteries). As an example, the second display unit 120 may include a battery configured to power at least the planar display 122 of the second display unit 120. As an example, the extended planar display 190 may consume more power than the planar display 112 of the first display unit 110. In such an example, where the second display unit 120 includes a battery, the battery may provide power that, at least in part, powers the extended planar display 190.

Figure 2:
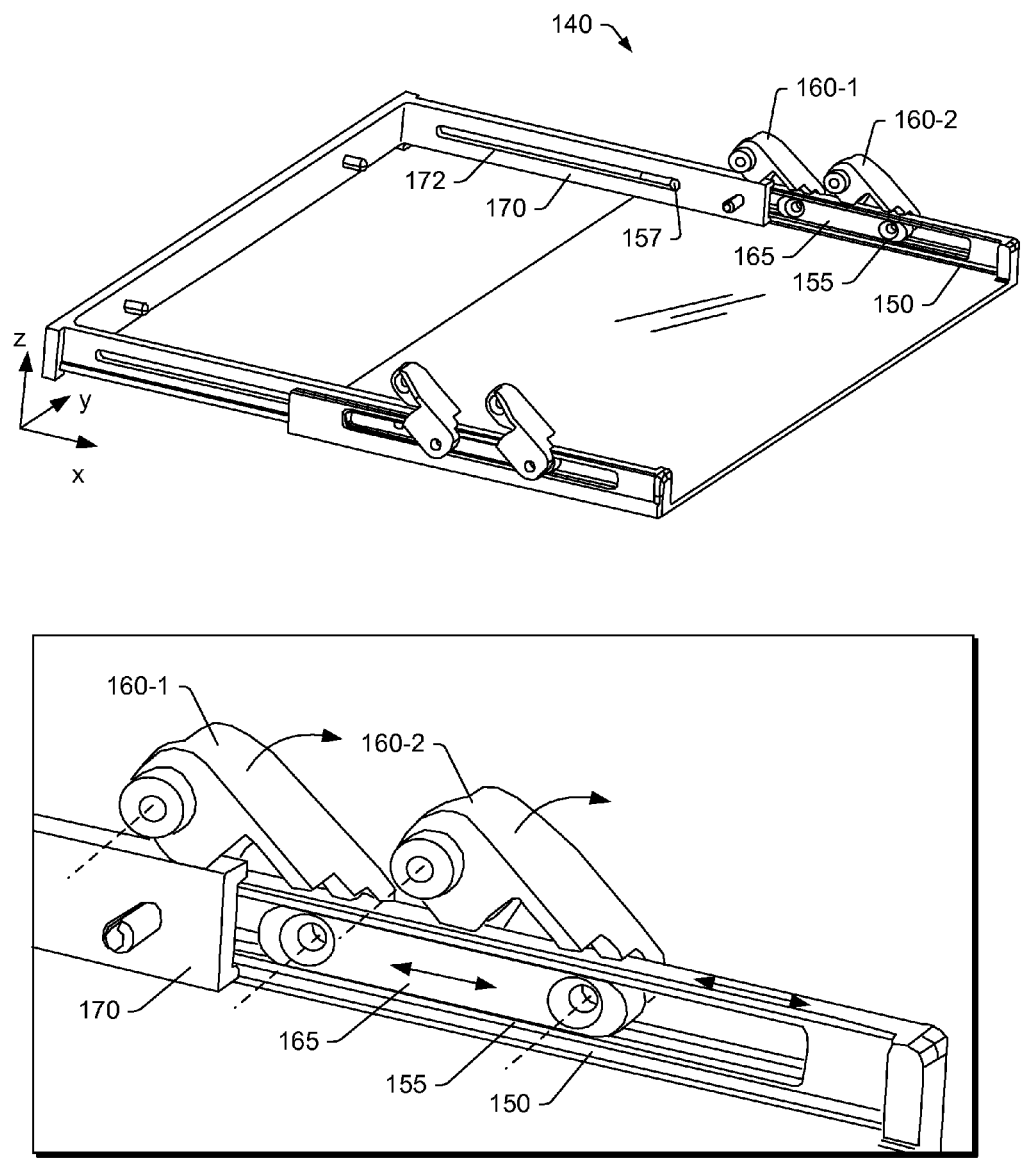
FIG. 2 is a series of diagrams of various examples of components.

FIG. 2 shows various examples of components, for example, which may be part of the system 100 of FIG. 1 (e.g., part of the mechanism 140, etc.). In FIG. 2, a perspective view illustrates examples of components such as the rail 150, the pivot arms 160-1 and 160-2 and the guide 170.

In FIG. 2, the pivot arms 160-1 and 160-2 include pivot axes (see, e.g., dashed lines). As an example, the upper pivot axes may cooperate with a first display unit (e.g., the unit 110) while the lower pivot axes may cooperate with a linkage 165 that rides in a slot 155 of the rail 150. As an example, the rail 150 may ride in the guide 170 and the linkage 165 may ride in the slot 155 of the rail 150. As an example, the guide 170 may include a slot 172 that accommodates a post 157 of the rail 150 where the post 157 may travels in the slot 172 and act as a stop to stop translation of the rail 150 with respect to the guide 170. As an example, the linkage 165 may then travel in the slot 155 of the rail 150 and then a unit may be pivoted via the pivot arms 160-1 and 160-2 to position the unit, for example, to form an extended display between the unit and another unit operatively coupled to the guide 170.

As shown in the example of FIG. 2, the pivot arms 160-1 and 160-2 are shaped to seat a unit interiorly with respect to the rail 150. In particular, the pivot arms 160-1 and 160-2 may pivot downwardly such that the upper and lower pivot axes may be substantially aligned, for example, along a length of the linkage 165 (see, e.g., the orientation 105 of FIG. 1). As an example, a portion of a guide may block a pivot arm from pivoting downward until the pivot arm clears the guide (see, e.g., the orientation 103 of FIG. 1). As an example, a pivot arm may include a portion that may sit on along an outer side of a rail and a portion that may sit along an inner side of a rail where, for example, the pivot arm may be coupled to a linkage that may travel in a slot of the rail.

As an example, a linkage and one or more pivot arms may be referred to as a carriage that may operatively couple to a unit, for example, to carry the unit and position the unit in one or more orientations. As an example, a carriage may travel with respect to a rail (e.g., to ride in and/or on a rail). As an example, a rail may be supported by a rail guide. As an example, a mechanism may be a telescoping mechanism. As an example, a mechanism may include a cover, for example, that may cover at least part of a unit. As an example, a mechanism may be disassembled and be reassembled, for example, to operatively couple a first display unit and a second display unit. As an example, a mechanism may couple to a display unit via one or more cooperating features. For example, an axel may couple a display unit to a pivot arm where the axel is received by an opening in the display unit. As an example, a guide may couple to a display unit, for example, via one or more cooperating features (e.g., pins and openings, etc.). As an example, a display unit may fit into a frame, for example, a guide is part of the frame (e.g., and where the frame may be part of a mechanism). As an example, a lip or lips, a press-fit mechanism, etc. may act to retain a display unit in a frame (e.g., optionally allowing for user assembly and disassembly of the frame and the display unit).

As an example, a mechanism may include an opening, for example, for positioning a connector (e.g., a power connector, a communication connector, a power and communication connector, etc.). For example, in an assembled state, an opening may exist in a rail, a rail guide, etc. for connecting a connector to a unit. As an example, a unit may be carried by a portion of a mechanism, for example, where a connector of the unit may be unimpeded by the mechanism (e.g., in a stacked orientation or in a side-by-side orientation). For example, a unit may be coupled to one or more pivot arms in a manner where the unit may be coupled to a cord via a connector of the unit (e.g., a rail slot, a linkage opening, etc. may allow for insertion of a connector of a cord).

Figure 3:
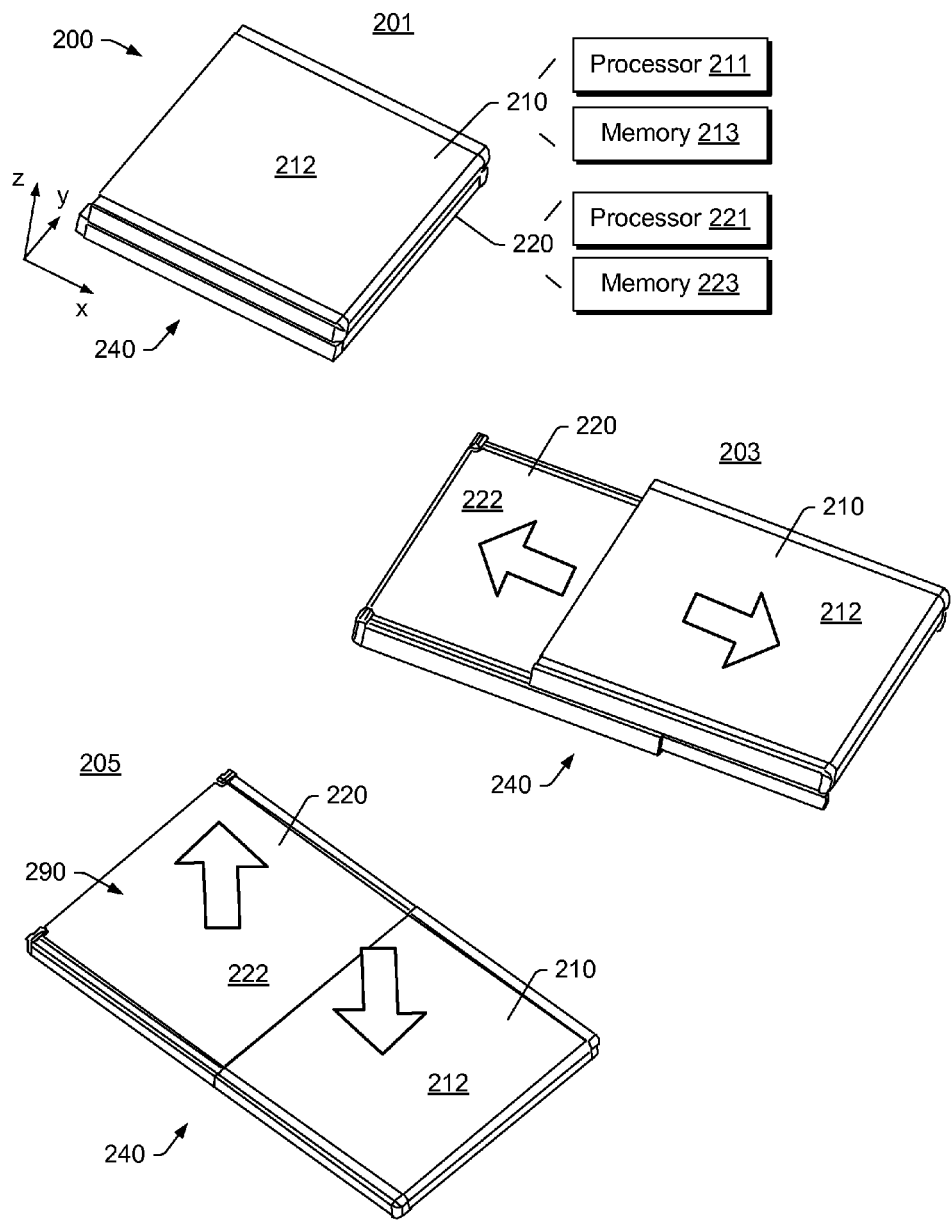
FIG. 3 is a series of diagrams of an example of a system.

FIG. 3 shows an example of a system 200 that includes a first display unit 210 with a planar display 212, a second display unit 220 with a planar display 222 and a mechanism 240 that selectively transitions the first display unit 210 and the second display unit 220 between a stacked orientation 201 and a side-by-side orientation 205 that forms a planar extended display 290 (e.g., from the planar display 212 and the planar display 222). FIG. 3 shows the stacked orientation 201 and the side-by-side orientation 205 along with a transitional orientation 203. The orientations 203 and 205 are shown with large arrows to indicate relative movement of the first display unit 210 and the second display unit 220. For example, one or both of the display units 210 and 220 may be moved to transition from one orientation to another orientation.

As an example, the first display unit 210 may include a processor 211 and, for example, memory 213 operatively coupled to the processor 211. In such an example, the processor 211 may render information to the planar display 212 of the first display unit 210, for example, in the stacked orientation 201 and, for example, may render information to the extended planar display 290 (e.g., formed by the planar display 212 of the first display unit 210 and the display 222 of the second display unit 220), for example, in the side-by-side orientation 205. As an example, the second display unit 220 may include a processor 221 and, for example, memory 223 operatively coupled to the processor 221. As an example, the second display unit 220 may include circuitry to receive information from the first display unit 210 and for rendering such information to the planar display 222 of the second display unit 220.

As an example, the system 200 may be assembled and disassembled. For example, the mechanism 240 may be optionally configured to connect and disconnect from the first display unit 210. As an example, a user may have the first display unit 210, desire an extended display, acquire the mechanism 240 along with the second display unit 220 and connect the mechanism 240 and the second display unit 220 to the first display unit 210 to form the system 200.

As an example, the system 200 may include one or more interfaces for transfer of information from one of the display units 210 and 220 to the other of the display units 210 and 220. As an example, the system 200 may include one or more interfaces for transfer of information between the display units 210 and 220. As an example, an interface may be a wireless interface. As an example, an interface may be a wired interface. As an example, an interface may be operable and/or implemented in the side-by-side orientation 205. As an example, a transition to the side-by-side orientation 205 may trigger interface circuitry, for example, to cause information to be rendered to the extended planar display 290 (e.g., to both the planar display 212 and the planar display 222, optionally simultaneously).

As an example, the first display unit 210 may include a battery or batteries. As an example, the second display unit 220 may include a battery or batteries. As an example, the first display unit 210 and the second display unit 220 may each include a battery (e.g., or batteries). As an example, the second display unit 220 may include a battery configured to power at least the planar display 222 of the second display unit 220. As an example, the extended planar display 290 may consume more power than the planar display 212 of the first display unit 210. In such an example, where the second display unit 220 includes a battery, the battery may provide power that, at least in part, powers the extended planar display 290.

Figure 4:
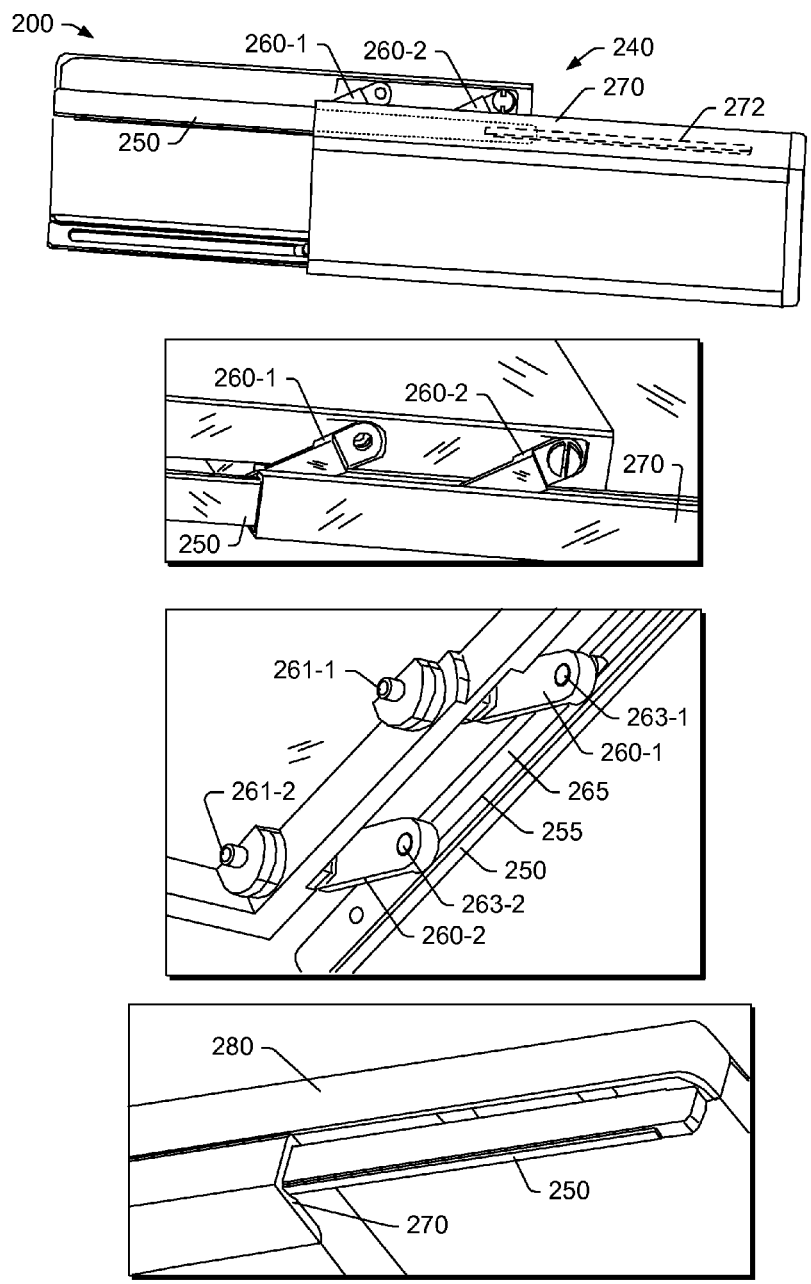
FIG. 4 is a series of diagrams of an example of a system.

FIG. 4 shows various views of an example of the mechanism 240 of the system 200 of FIG. 3. As an example, the mechanism 240 may include a rail 250 that may be operatively coupled to the first display unit 210 via one or more pivot arms 260-1 and 260-2. As an example, the mechanism 240 may include a guide 270 where, for example, the rail 250 may translate in the guide 270 (e.g., to be guided by the guide 270). As an example, a mechanism may include one or more pivot arms or linkages that pivotably transition a first planar display with respect to a second planar display to form a planar extended display.

In the example of FIG. 4, the pivot arms 260-1 and 260-2 include pivot axels 261-1, 261-2, 263-1 and 263-2. The pivot axels 261-1 and 261-2 may cooperate with the first display unit 210 while the pivot axels 263-1 and 263-2 may cooperate with a linkage 265 that rides in a slot 255 of the rail 250. As an example, the rail 250 may ride in the guide 270 and the linkage 265 may ride in the slot 255 of the rail 250. As an example, the second display unit 220 may include one or more features (see, e.g., the recessed feature 272) that accommodate one or more components of the mechanism 240. As an example, via the mechanism 240, the first display unit 210 may translate and pivot with respect to the second display unit 220 to form the extended display 290. As an example, a display unit may include features to accommodate a mechanism such as, for example, the mechanism 240. As an example, a mechanism may be disassembled and be reassembled, for example, to operatively couple a first display unit and a second display unit.

As an example, a system may include one or more cover. For example, the system 200 of FIG. 4 is shown as including a cover 280 that covers a portion of the mechanism 240. For example, a cover may at least partially cover one or more pivot arms. As an example, a mechanism may be provided on one side or multiple sides. For example, the mechanism 240 may be a single sided mechanism or it may be replicated to be a dual sided mechanism. As an example, a mechanism may include one or more features on one side that may differ from one or more features on another side. For example, a mechanism on one side may provide for switching circuitry, for example, to enable and disable transfer of information from one unit to another unit (e.g., depending on orientation of the units, transition of the units from one orientation to another, etc.).

As an example, a mechanism may include a telescoping pivot arm. For example, a length of a pivot arm may be extendible and collapsible for transitioning a system between a stack orientation and a side-by-side orientation to form an extended display. For example, a mechanism may include a pivot arm that may pivot and extend to provide clearance to clear one unit with respect to another unit and then may collapse to position the units side-by-side to form an extended display. As an example, a pivot arm may include a guide that can guide the pivot arm with respect to another component such as an axel. For example, a pivot arm may be extended via a guide while being connected via an axel that rides in the guide. In such an example, the pivot arm may be collapsed, for example, to position units side-by-side to form an extended display.

As an example, a system may include a processor; memory operatively coupled to the processor; a first display unit operatively coupled to the processor; a second display unit; and a mechanism that selectively transitions the first display unit and the second display unit between a stacked orientation and a side-by-side orientation that forms a planar extended display operatively coupled to the processor.

As an example, a system can include a processor; memory operatively coupled to the processor; a first display unit operatively coupled to the processor; a second display units; a rail operatively coupled to the first display unit; and a pivot arm that operatively couples the second display unit to the rail.

As an example, a system can include a processor; memory operatively coupled to the processor; a first display unit operatively coupled to the processor; a second display unit; and a pivot arm operatively coupled to the first display unit and operatively coupled to the second display unit.

Figure 5:
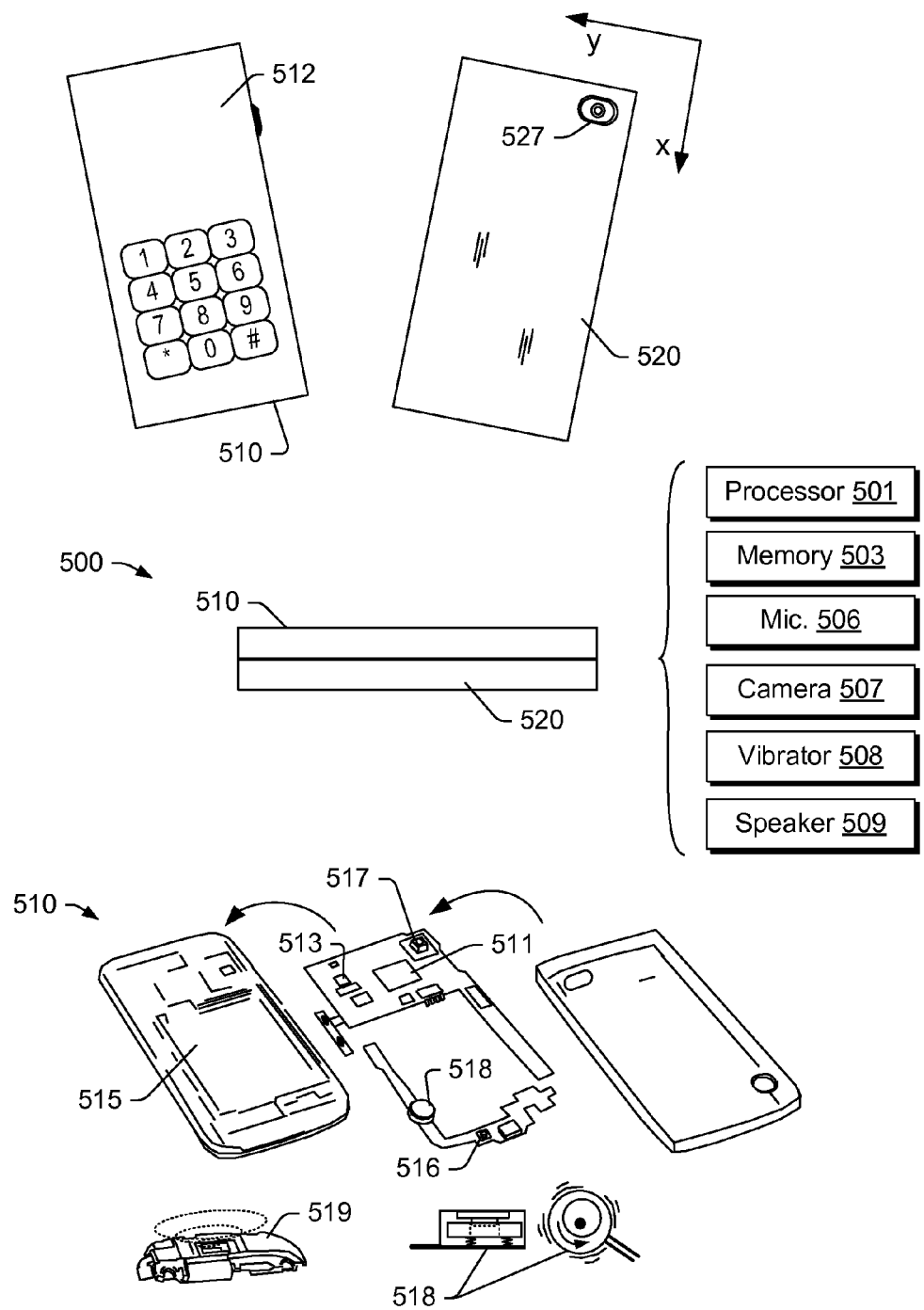
FIG. 5 is a series of diagrams of an example of a system.

FIG. 5 shows an example of a system 500 that may include a mobile device unit 510 that includes a display 512, which may be a touch display (e.g., a touchscreen display) for input of information (e.g., via a key pad, control graphics, etc.) and output of information. As an example, consider a display with a resolution of about 1280×720 pixels and/or a density of about 300 pixels per inch; noting that one or more displays may include other resolutions and/or densities.

As shown in the example of FIG. 5, the system 500 also includes another unit 520, which may include, for example, a camera 527. The unit 520 may also include a display which may be a touch display (e.g., a touchscreen display) for input of information (e.g., via a key pad, control graphics, etc.) and output of information. As an example, consider a display with a resolution of about 1280×720 pixels and/or a density of about 300 pixels per inch; noting that one or more displays may include other resolutions and/or densities. As an example, a display may include one or more LEDs. As an example, a display may be an LED backlit display, for example, consider an LED backlit LCD display. As an example, the system 500 may include a mechanism that can transition the units 510 and 520 from a stacked orientation to a side-by-side orientation.

As an example, the system 500 can include various components such as a processor 501, memory 503 operatively coupled to the processor 501, a microphone 406 operatively coupled to the processor 501, a camera 507 operatively coupled to the processor 501, a vibrator 508 operatively coupled to the processor 501 and a speaker 509 operatively coupled to the processor 501. As an example, one or more components may be included in the unit 510 and one or more components may be included in the unit 520.

As shown in the example of FIG. 5, the unit 510 may include a processor 511, memory 513, a battery 515, a microphone 516, a camera 517, a vibrator 518 and a speaker 519. As an example, the unit 510 may be configured as a phone such as a smart phone. As an example, the unit 510 may include wireless communication circuitry (e.g., one or more of 3G, 4G, LTE, WiFi, BLUETOOTH®, etc.). As an example, the unit 510 may include wired communication circuitry (e.g., USB, LAN, DSL, etc.).

As an example, the units 510 and 520 may include connectors for wired connection and/or connectors for wireless connection. As an example, information may be transmitted from one unit to another. As an example, power may be transmitted from one unit to another. As an example, information and power may be transmitted from one unit to another. As an example, transmission of power and/or information may occur depending on orientation of the system 500. For example, a transition from a stacked orientation to a side-by-side orientation may enable one or more of transmission of power and/or information. As an example, the unit 520 may be a display unit and a power back-up unit. As an example, the unit 520 may be a display unit and a camera unit. As an example, where the unit 520 includes a back facing camera, circuitry in the system 500 may operatively couple the camera (e.g., the camera 527) to the display 512 of the unit 510. In such an example, a user may point the system 500 in the stacked orientation for capturing images and images in the field of view of the camera of the unit 520 may be displayed on the display 512 of the unit 510.

As an example, both units 510 and 520 may include cameras, for example, where a back facing camera of the unit 510 may be disabled when the units 510 and 520 are in a stacked orientation and where the back facing camera 527 of the unit 520 may be enabled in the stacked orientation. As an example, in a side-by-side orientation, where each of the units 510 and 520 include a back facing camera, one or both of the cameras may be enabled, optionally to capture stereo images (e.g., still, video, etc.). As an example, where each of the units 510 and 520 include a microphone, stereo audio recording may optionally be enabled (e.g., in the side-by-side orientation).

As mentioned, a unit may include a battery. As an example, a system may include two units where each of the units includes one or more batteries.

As an example, a unit (e.g., the unit 510 and/or the unit 520) may include a battery bay, display graphics circuitry (e.g., optionally including touch and gesture circuitry) a camera (e.g., configured for capturing still images, video, etc.), optionally auto-focus circuitry, optionally a flash for flash photography/videography, a SIM slot, a main processor, audio circuitry (e.g., for notifications such as ringtones, etc.), power management circuitry, motion processing circuitry (e.g., accelerometer, gyroscope), modem circuitry, pressure sensor circuitry, multi-band power amplification circuitry, memory (e.g., SDRAM, etc.), wireless LAN circuitry, smart card circuitry, transmitter circuitry, ambient light sensing circuitry, and GPS circuitry. As an example, a unit may include voice recognition circuitry (e.g., speech recognition circuitry), for example, as a feature for input of phone numbers, contact names, etc.

Figure 6:
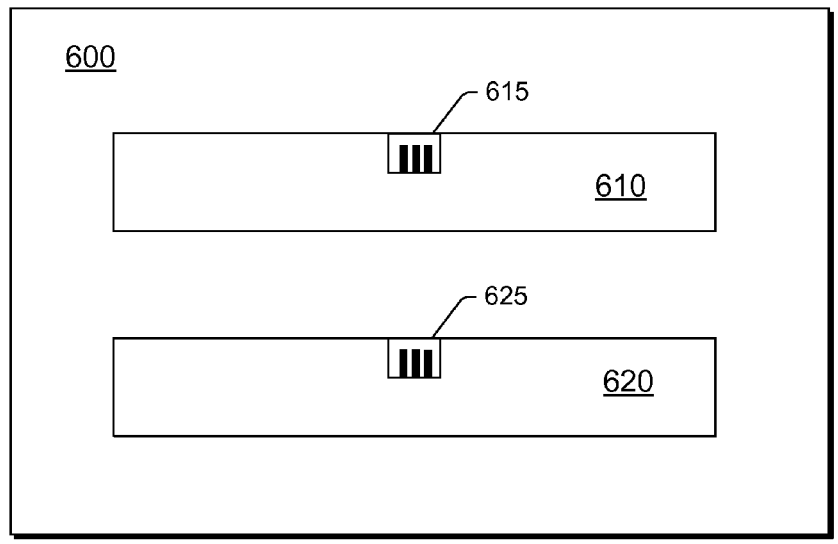
FIG. 6 is a series of diagrams of an example of a system.
Figure 6:
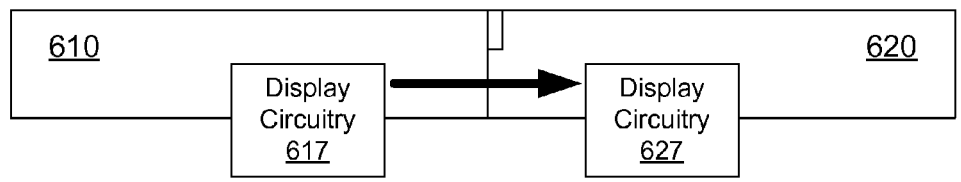
Figure 6:
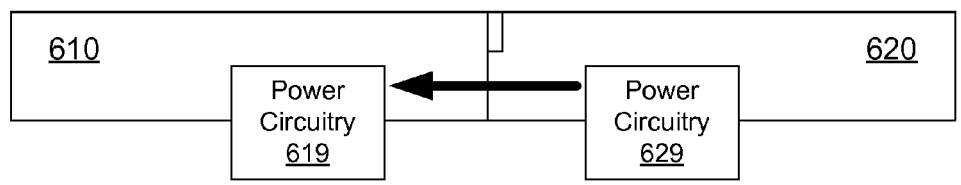

FIG. 6 shows an example of a system 600 that includes units 610 and 620. As shown, the units 610 and 620 include interfaces 615 and 625 that may be operatively coupled to form an interface for transmission of information and/or for transmission of power. For example, the units 610 and 620 may include display circuitry 617 and 627 for rendering information where the display circuitry 617 may transmit information to the interface 615 for transmission to the interface 625 such that the display circuitry 627 can render the transmitted information, for example, on a portion of an extended display formed by a display of the unit 610 and a display of the unit 620. As an example, the units 610 and 620 may include power circuitry 619 and 629 for powering one or more components where the power circuitry 629 may transmit power to the interface 625 for transmission to the interface 615 such that the power circuitry 619 can power one or more components of the system 600.

Figure 7:
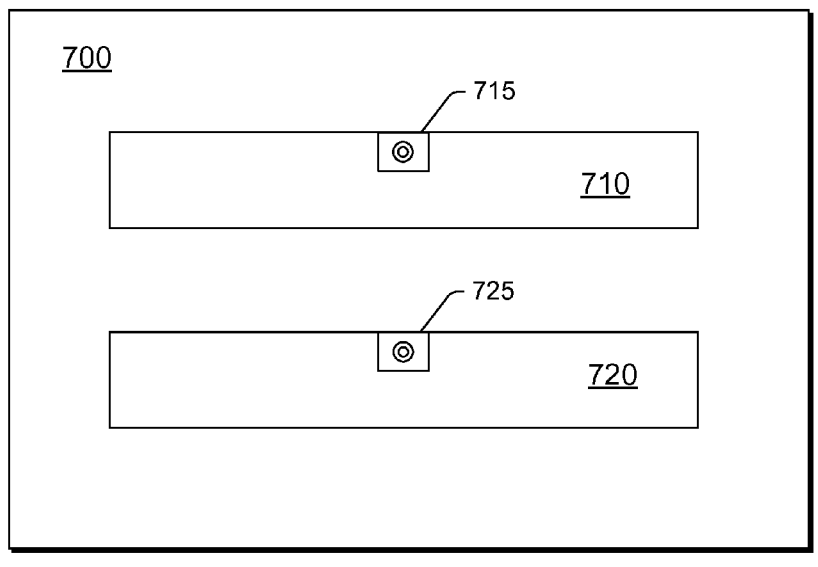
FIG. 7 is a series of diagrams of an example of a system.
Figure 7:
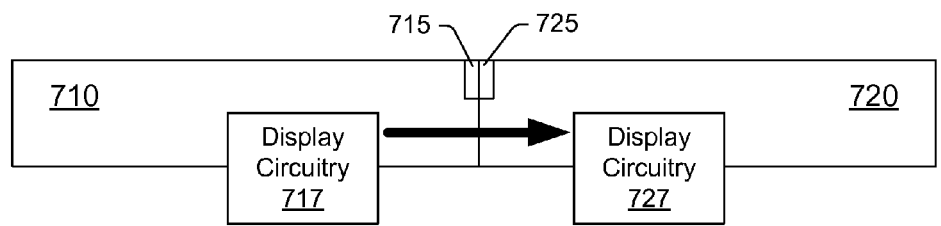
Figure 7:
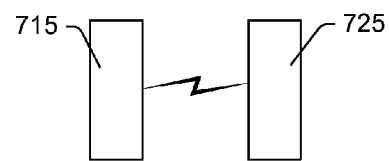

FIG. 7 shows an example of a system 700 that includes units 710 and 720. As shown, the units 710 and 720 include interfaces 715 and 725 that may be operatively coupled to form an interface for transmission of information. For example, the units 710 and 7620 may include display circuitry 717 and 727 for rendering information where the display circuitry 717 may transmit information to the interface 715 for transmission to the interface 725 such that the display circuitry 727 can render the transmitted information, for example, on a portion of an extended display formed by a display of the unit 710 and a display of the unit 720. As an example, the units 710 and 720 may optionally include power circuitry for powering one or more components where the power circuitry of one unit may transmit power to the other unit. As an example, such power transmission may occur via a wired and/or a wireless power interface (e.g., consider a coil that can receive electromagnetic waves and associated circuitry that can convert the received electromagnetic waves into energy that may be used and/or stored.

In the example of FIG. 7, the interfaces 715 and 725 may be wireless interfaces. As an example, such interfaces may be IR, BLUETOOTH®, WiFi, or other interfaces. As an example, such interfaces may be configured for unidirectional and/or bi-directional transmissions of information (e.g., transmission and receipt of information).

Figure 8:
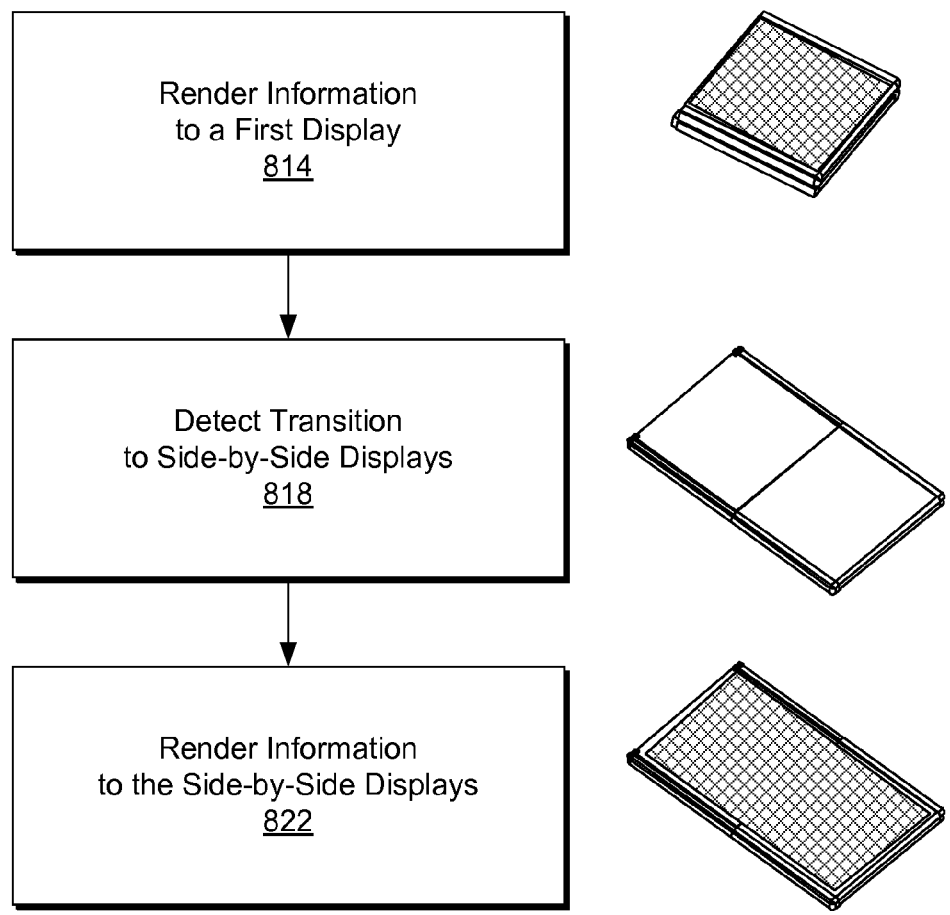
FIG. 8 is a diagram of an example of a method.

FIG. 8 shows an example of a method 810 that includes a render block 814 for rendering information to a first display, a detection block 818 for detecting a transition to side-by-side displays (e.g., formed via the first display and a second display) and a render block 822 for rendering information to the side-by-side displays.

As an example, a unit may include an accelerometer and another unit may include an accelerometer. In such an example, a differential may be sensed via the accelerometers to determine that they have been repositioned with respect to each other. As an example, a system may include a position sensor such that a position of a unit may be sensed with respect to another unit (e.g., a proximity sensor, a light sensor, etc.). As an example, a unit may include an antenna where, for example, a signal received by the antenna may differ depending on whether the unit is in a system and whether the unit is in a particular orientation with respect to another unit of the system. As an example, a mechanism may include a trigger, for example, a post may move to against a stop surface where contact between the post and the stop surfaces triggers circuitry as to whether or not a system is in a particular orientation (e.g., a side-by-side orientation or a stacked orientation).

As an example, a method can include rendering information to a first planar display of a system that includes a processor, memory operatively coupled to the processor, the first planar display operatively coupled to the processor, a second planar display, and a mechanism that selectively transitions the first planar display and the second planar display between a stacked orientation and a side-by-side orientation that forms a planar extended display operatively coupled to the processor; and, responsive to detection of a transition from the stacked orientation to the side-by-side orientation, rendering information to the planar extended display formed by the first planar display and the second planar display. As an example, such a method may include transmitting information to the second planar display via a wireless interface (e.g., and rendering the information). As an example, a method may include transmitting information to the second planar display via a wired interface (e.g., and rendering the information). As an example, a method may include receiving touch input via a planar extended display (e.g., as formed by a first planar display and a second planar display).

A system can include a processor; memory operatively coupled to the processor; a first display unit that includes a first planar display operatively coupled to the processor; a second display unit that includes a second planar display; and a mechanism that selectively transitions the first planar display and the second planar display between a stacked orientation and a side-by-side orientation that forms a planar extended display operatively coupled to the processor.

As an example, a system can include an interface (e.g., formed by respective connectors or interfaces of a first unit and a second unit). As an example, a display unit includes an interface. As an example, an interface may be a wired interface and a mechanism may selectively engage and disengage the interface (e.g., via positioning components). As an example, an interface may be a wireless interface. As an example, a mechanism may selectively engage and disengage a wireless interface, for example, via proximity sensing (e.g., via signal strength), via a mechanical trigger (e.g., a mechanical switch), via an electrical switch, etc.

As an example, an interface may be operatively coupled to a processor, for example, for receipt and/or transmission of information where, for example, such information may be render to an extended display formed by first and second planar displays (e.g., in a side-by-side orientation).

As an example, a unit may include display circuitry, which may include a graphics processor (e.g., a GPU). As an example, a unit may include a GPU and another unit may include a CPU and optionally a GPU. As an example, a first unit and a second unit may each include a GPU. As an example, a system may be a wireless display system, for example, that may receive information via a wired or a wireless interface for rendering to one or more displays of the system.

As an example, a mechanism may include a rail and a rail guide (e.g., a guide). In such an example, the mechanism may include a pivot arm that operatively couples a display unit to the rail. As an example, a system may include a rail cover. As an example, a system may include at least two rails and at least two rail guides.

As an example, a system may include at least one pivot arm that operatively couples a first display unit and a first planar display unit.

As an example, a system may include a first planar display with associated touch circuitry and a second planar display with associated touch circuitry. In such an example, a side-by-side orientation of the displays may form an extended display that may be associated with touch circuitry for input of commands, etc. via touching of the extended display. As an example, touch circuitry may include "pen" circuitry, for example, such as circuitry for an electromagnetic digitizer.

As an example, an assembly can include a unit that includes a supplemental planar display; and a mechanism that couples the unit to a device that includes a processor and a primary planar display operatively coupled to the processor and that selectively transitions the supplemental planar display and the primary planar display between a stacked orientation and a side-by-side orientation that forms a planar extended display operatively coupled to the processor. As an example, the unit may include an interface, which may be a wired or a wireless interface. As an example, a system may include a wired and a wireless interface. As an example, a mechanism may selectively engage and disengage one or more interfaces. As an example, a mechanism may include a rail and a rail guide. As an example, an assembly may include at least one pivot arm that operatively couples a unit to a device.

As an example, a system can include a processor; memory operatively coupled to the processor; a first display unit that includes a first planar display operatively coupled to the processor; a second display unit that includes a second planar display; a rail operatively coupled to the first display unit; and a pivot arm that operatively couples the second display unit to the rail. As an example, the rail and the pivot arm may provide for transitioning the first planar display and the second planar display between a stacked orientation and a side-by-side orientation that forms a planar extended display operatively coupled to the processor.

As an example, a system may include units with form factors defined by, for example, a length and a width. For example, consider a form factor that includes length and width dimensions in a range of about 4 inches to about 6 inches. As an example, a form factor may be selected based in part on pocket size, for example, a shirt pocket, a pant pocket, a purse, etc. As an example, a system may include two units that may include, for example, length and width dimensions in a range of about 4 inches to about 6 inches. In such an example, the units may be positioned in a side-by-side orientation to form an extended display with a larger dimension (e.g., a larger length or a larger width). As an example, in a side-by-side orientation, the units may form an extended display that may be approximately double the area of a display of a single one of the units.

As an example, a system may include two units (e.g., or more) with substantially the same dimensions (e.g., length and width and/or height). As an example, a system may include two units with length and width dimensions of approximately 115 mm by approximately 57 mm (e.g., and optionally a height dimension of approximately 6 mm). In such an example, where the units may be oriented in a side-by-side orientation, an extended display may be formed with length and width dimensions of about 115 mm by about 115 mm (e.g., and optionally a height dimension of approximately 6 mm). As an example, one unit may move via a mechanism relative to another unit to form an extended display in a so-called tablet mode and may transition to a stacked orientation with a smaller display in a so-called phone mode (e.g., with a height or thickness determined by a height of each unit). As an example, in a table mode, an extended display may be formed by a first display of a first unit and a second display of a second unit where the first and second displays are aligned in a common horizontal plane (e.g., optionally allowing for a single, borderless, display to be available). As an example, in a side-by-side orientation, two displays may be positioned adjacent to each other along respective edges, which may be of approximately the same dimension (e.g., a length or a width dimension of each of the displays).

As described herein, various acts, steps, etc., may be implemented as instructions stored in one or more computer-readable storage media. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 9:
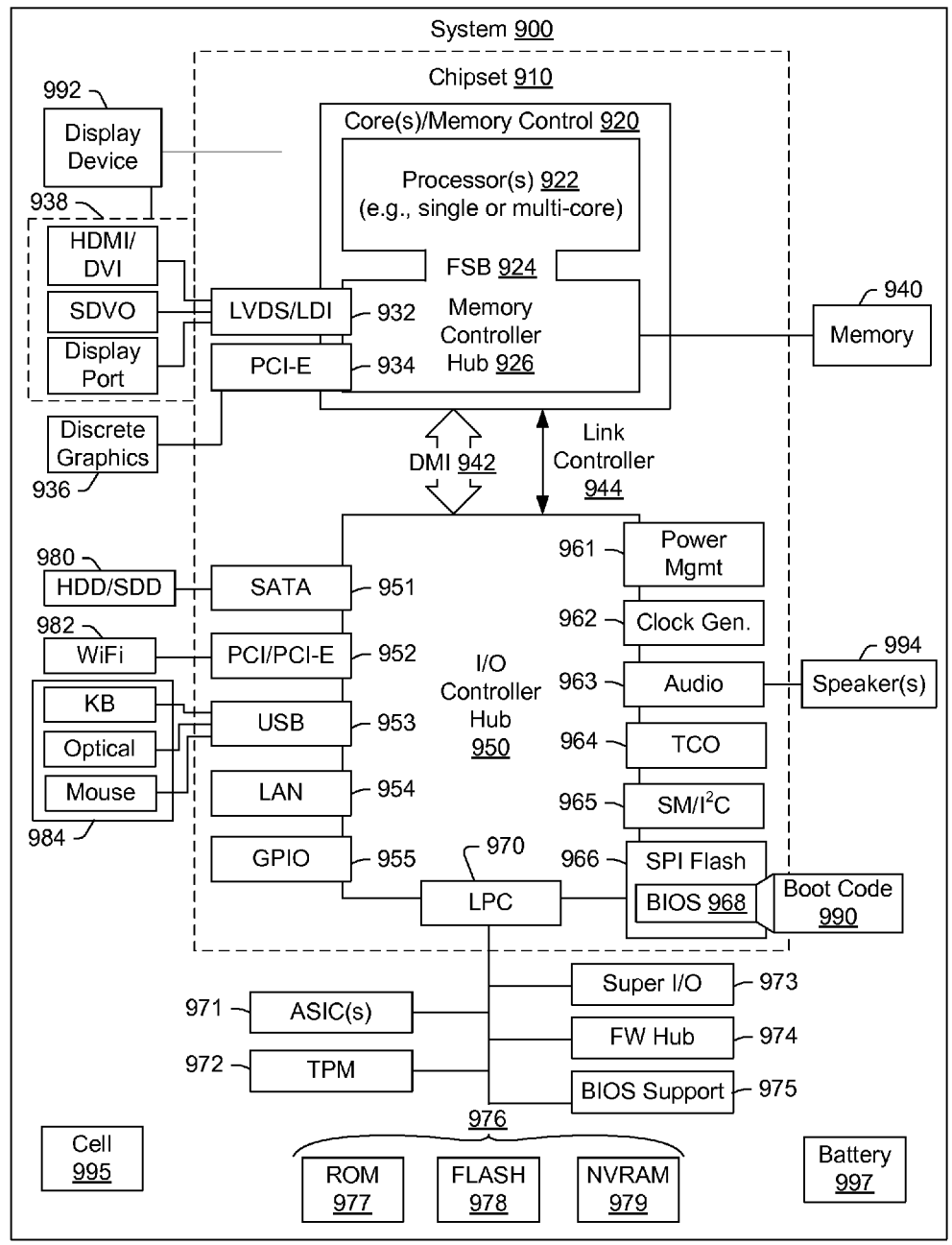
FIG. 9 is a diagram of an example of a system that includes one or more processors.

While various examples of circuits or circuitry have been discussed, FIG. 9 depicts a block diagram of an illustrative computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 900. As an example, a device such as one of the devices of FIGS. 1 and 3 may include at least some of the features of the system 900.

As shown in FIG. 9, the system 900 includes a so-called chipset 910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, mice and various other devices (e.g., microphones, cameras, phones, storage, media players, etc.). On or more other types of sensors may optionally rely on the USB interface 953 or another interface (e.g., I²C, etc.). As to microphones, the system 900 of FIG. 9 may include hardware (e.g., audio card) appropriately configured for receipt of sound (e.g., user voice, ambient sound, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a satellite, a base, a server or other machine may include fewer or more features than shown in the system 900 of FIG. 9. Further, the system 900 of FIG. 9 is shown as optionally include cell phone circuitry 995, which may include GSM, CDMA, etc., types of circuitry configured for coordinated operation with one or more of the other features of the system 900. Also shown in FIG. 9 is battery circuitry 997, which may provide one or more battery, power, etc., associated features (e.g., optionally to instruct one or more other components of the system 900). As an example, a SMBus may be operable via a LPC (see, e.g., the LPC interface 970), via an I²C interface (see, e.g., the SM/I²C interface 965), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
   a processor;
   memory operatively coupled to the processor;
   a first display unit that comprises a length, a width, a height and a first planar display operatively coupled to the processor;
   a second display unit that comprises a length, a width, a height and a second planar display; and
   a mechanism that selectively transitions the first planar display and the second planar display between a stacked orientation and a side-by-side orientation that forms a planar extended display operatively coupled to the processor wherein the mechanism comprises a rail guide operatively coupled to the first display unit and a widthwise rail that carries a linkage that comprises two pivot arms operatively coupled to the second display unit wherein, for the transitions, the widthwise rail is translatable via the rail guide in a widthwise direction, the linkage is translatable via the rail in the widthwise direction, and the two pivot arms are pivotable with respect to the linkage.

2. The system of claim 1 wherein the second display unit comprises an interface.

3. The system of claim 2 wherein the interface comprises a wired interface and wherein mechanism selectively engages and disengages the interface.

4. The system of claim 2 wherein the interface comprises a wireless interface.

5. The system of claim 1 comprising a rail cover.

6. The system of claim 1 comprising at least two rails and at least two rail guides.

7. The system of claim 1 comprising at least two sets of pivot arms.

8. The system of claim 1 wherein the first planar display comprises touch circuitry and wherein the second planar display comprises touch circuitry.

9. An assembly comprising:
   a unit that comprises a unit length, a unit width, a unit height and a supplemental planar display; and
   a mechanism that couples the unit to a device that comprises a device length, a device width, a device height, a processor and a primary planar display operatively coupled to the processor and that selectively transitions the supplemental planar display and the primary planar display between a stacked orientation and a side-by-side orientation that forms a planar extended display operatively coupled to the processor wherein the mechanism comprises a rail guide and a widthwise rail that carries a linkage that comprises two pivot arms that operatively couple the unit to the device wherein, for the transitions, the widthwise rail is translatable via the rail guide in a widthwise direction, the linkage is translatable via the rail in the widthwise direction, and the two pivot arms are pivotable with respect to the linkage.

10. The assembly of claim 9 wherein the unit comprises an interface.

11. The assembly of claim 10 wherein the interface comprises a wired interface and wherein the mechanism selectively engages and disengages the interface.

12. The assembly of claim 10 wherein the interface comprises a wireless interface.

13. The assembly of claim 9 comprising at least two sets of pivot arms that couple the unit to the device.

14. A method comprising:
   rendering information to a first planar display of a system that comprises a length, an extendable width, a transitionable height, a processor, memory operatively coupled to the processor, the first planar display operatively coupled to the processor, a second planar display, and a mechanism that selectively transitions the first planar display and the second planar display between a stacked orientation and a side-by-side orientation that forms a planar extended display operatively coupled to the processor wherein the mechanism comprises a rail guide and a widthwise rail that carries a linkage that comprises two pivot arms coupled to one of a first unit that comprises the first planar display and a second unit that comprises the second planar display wherein, for the transitions, the widthwise rail is translatable via the rail guide in a widthwise direction, the linkage is translatable via the rail in the widthwise direction, and the two pivot arms are pivotable with respect to the linkage; and
   responsive to detection of a transition from the stacked orientation to the side-by-side orientation, rendering information to the planar extended display formed by the first planar display and the second planar display.

15. The method of claim 14 wherein the rendering comprises transmitting information to the second planar display via a wireless interface.

16. The method of claim 14 wherein the rendering comprises transmitting information to the second planar display via a wired interface.

17. The method of claim 14 comprising receiving touch input via the planar extended display.

18. A system comprising:
   a processor;
   memory operatively coupled to the processor;
   a first display unit that comprises a length, a width, a height, and a first planar display operatively coupled to the processor;
   a second display unit that comprises a length, a width, a height, and a second planar display;
   a rail guide operatively coupled to the first display unit;
   a widthwise rail that translates via the rail guide in a widthwise direction; and
   a linkage translatably carried by the widthwise rail for translation in the widthwise direction wherein the linkage comprises pivot arms that operatively couple the second display unit to the rail via the linkage wherein the widthwise rail and linkage are translatable and the pivot arms are pivotable to transition the first planar display and the second planar display between a stacked orientation and a side-by-side orientation that forms a planar extended display operatively coupled to the processor.

* * * * *